United States Patent Office 3,243,452
Patented Mar. 29, 1966

3,243,452
BIS(HYDROXYDIARYLPHOSPHINE)
DECABORANES
Hansjuergen A. Schroeder, New Haven, Conn., assignor to Olin Mathieson Chemical Corporation, a corporation of Virginia
No Drawing. Filed June 28, 1962, Ser. No. 205,861
4 Claims. (Cl. 260—500)

This invention relates to novel phosphorus-containing decaborane derivatives which are useful as intermediates in the preparation of high temperature resistant polymers. More particularly, this invention relates to bis(hydroxydiarylphosphine) decaboranes of the general formula:

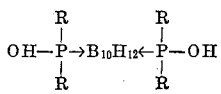

wherein R is an aryl or alkaryl radical, and to a method for their preparation.

In the first phase of the novel reaction of this invention a bis(halodiarylphosphine) decaborane is reacted with water in the presence of a di(lower alkyl) amine to form the bis di(lower alkyl) amine salt of the bis(hydroxydiarylphosphine) decaborane. The reaction proceeds as follows in the first phase:

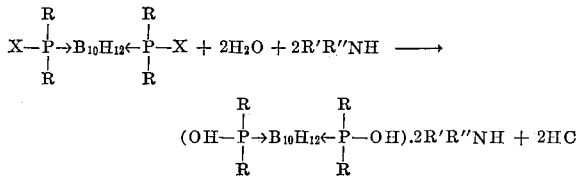

wherein X is a halogen, R is an aryl radical selected from the group consisting of phenyl, tolyl, xylyl, naphthyl, biphenylyl etc. or an alkyl-substituted derivative of these same aryl radicals, and R′ and R″ are the same or different alkyl radicals having from 1 to 5 carbon atoms in each radical. In the second phase of the novel reaction the bis-dialkyl amine salt is treated with an alcoholic solution of a mineral acid, such as hydrochloric acid, hydrobromic acid, etc., thus yielding the free bis(hydroxydiarylphosphine) decaborane.

Suitable di(lower alkyl) amines include, for example, dimethyl amine, methyl ethyl amine, diethyl amine, diisopropyl amine, di-n-butyl amine, and diisoamyl amine.

The bis(halodiarylphosphine) decaboranes utilized as starting materials in the process of this invention can be prepared by the process set forth in Heying and Schroeder application S.N. 205,859, filed of even date herewith, now Patent No. 3,203,984 of August 31, 1965. The compound bis(chlorodiphenylphosphine) decaborane is prepared, for example, by reacting a solution of diphenylchlorophosphine in ether with a solution of decaborane in ether for about 2 hours at 25° C. and recovering the resulting product from the reaction mixture.

Other useful bis(halodiarylphosphine) decaboranes include bis(chlorodiphenylphosphine) decaborane, bis(chlorodinaphthylphosphine) decaborane, bis(chloroditolylphosphine) decaborane, bis(chlorodixylylphosphine) decaborane, bis(chlorodiethylpenylphosphine) decaborane, bis(chlorodimethylnaphthylphosphine) decaborane, etc. and the corresponding bromine, iodine and fluorine derivatives.

The first phase of the process of this invention (the preparation of the bis-di-lower alkyl amine salt of bis(hydroxydiarylphosphine) decaborane) can be carried out by passing a gaseous di(lower alkyl) amine into an aqueous suspension of the bis(halodiarylphosphine) decaborane or by adding the di(lower alkyl) amine in the form of an aqueous solution to an aqueous suspension of the bis(halodiarylphosphine) decaborane. In addition, the lower dialkyl amines, with the exception of dimethyl amine which is a gas at room temperature and atmospheric pressure, can be added directly to the aqueous suspension of the bis(halodiarylphosphine) decaborane. The quantity of water reacted with the decaborane derivative starting material can be varied widely from about 2 moles to about 500 moles of water per mole of the decaborane derivative charged to the reactor, and preferably from about 50 to about 350 moles of water per mole of the decaborane derivative are employed. It has been found that an excess of the di(lower alkyl) amine over the stoichiometric requirement is desirable in the process of this invention to promote the solubility of the reaction product in the reaction medium and thus cause the reaction to proceed to completion. As shown in the equation above the stoichiometric requirement is 2 moles of the amine for each mole of the bis(halodiarylphosphine) decaborane. In addition, in order to drive the reaction to completion it is necessary to bind the hydrogen halide formed during the reaction with a hydrogen halide acceptor. This can be done, for example, by using a 100 percent excess of the stoichiometric requirement of the di(lower alkyl) amine. Thus, in carrying out the reaction not less than 4 moles of the di(lower alkyl) amine are added to the reactor for each mole of the bis(halodiarylphosphine) decaborane and preferably from about 5 to 10 moles or more are supplied.

The bis-di(lower alkyl) amine salt formed in the first phase of the process is treated with an alcoholic solution of a mineral acid to form the desired free bis(hydroxydiarylphosphine) decaborane and the corresponding bis-di (lower alkyl) amine-mineral acid salt. Suitable mineral acids include hydrochloric, hydrobromic, sulfuric, etc. It is only necessary to add the stoichiometric quantity of the mineral acid, that is two moles of the mineral acid for each mole of bis-di(lower alkyl) amine salt of the bis (halodiarylphosphine) decaborane treated although an excess of the mineral acid in alcoholic solution of from about 150 to 200 percent of the stoichiometric quantity can be employed, if desired, to increase the yield. The strength of the alcoholic mineral acid solution used is not critical and solutions of from 1 percent up to a saturated solution of the mineral acid can be utilized.

The reaction proceeds satisfactorily at room temperature although temperatures of from about 10° C. up to about 100° C. can be utilized in the first phase of the reaction. Advantageously the second phase of the reaction can be effected at room temperature. The bis-di(lower alkyl) amine salt formed in the first phase can be conveniently recovered from the reaction mixture by evaporating off the excess amine and thereafter separating the amine salt of the bis(hydroxydiarylphosphine) decaborane which precipitates by filtration, decantation, or any other sort. The same salt of the bis(hydroxydiarylphosphine) decaborane is then treated with an alcoholic solution of a mineral acid, and the free bis(hydroxydiarylphosphine) is recovered by washing the product with hot water followed by recrystallization from a hydrocarbon solvent, such as xylene.

The novel bis(hydroxydiarylphosphine) decaboranes prepared by the process of this invention are useful in preparation of high temperature resistant polymers as described and claimed in Reiner and Schroeder application S.N. 205,862, filed of even date herewith, now Patent No. 3,141,856 of July 21, 1964. For example, if triethyl amine in benzene is added to an equimolar mixture of bis(chlorodiphenylphosphine) decaborane and bis-(hydroxydiphenylphosphine) decaborane and the mixture heated to reflux, a polymer having a molecular weight of about 27,000 is formed which is completely stable up to 270° C. When this polymer is heated above 270° C., hydrogen is given off although it does not soften at temperatures as high as 320° C. These valuable polymers are useful in a wide variety of applications because of their excellent heat resistance and extreme resistance to solvent action. Such polymers can be incorporated into phenol-formaldehyde plastics to increase the high temperature stability and solvent resistance of such products. In addition, these polymeric materials can be formed into films and are useful as protective coatings for metal parts in high temperature service.

The following examples illustrate specific embodiments of this invention and are not to be considered as limitative.

EXAMPLE I

*Bis(hydroxydiphenylphosphine) decaborane bis-dimethyl amine salt (I)*

Gaseous dimethyl amine was bubbled through a suspension of bis(chlorodiphenylphosphine) decaborane (5.61 g., 0.01 mole) in water (50 ml.). The mixture was stirred with cooling and solution occurred after 15 minutes. Upon evaporation of excess dimethyl amine, compound I separated, was filtered and dried in vacuo. The yield of crude product was 5.1 g. (93.5 percent of the theoretical quantity). Recrystallization from 300 ml. of a mixture of dimethylformamide and acetonitrile (2:1) gave 4.2 g. (77 percent of the theoretical quantity) of pure I, M.P. 224–226° C.

Compound I has the formula:

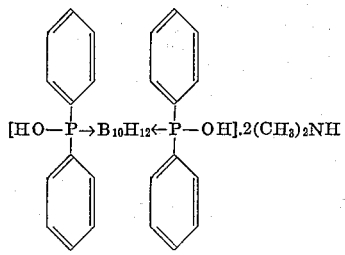

$[HO-P \rightarrow B_{10}H_{12} \leftarrow P-OH] \cdot 2(CH_3)_2NH$

Calc'd for $C_{28}H_{48}B_{10}N_2O_2P_2$: C, 54.69; H, 7.87; B, 17.60; N, 4.56; P, 10.08. Found: C, 55.08; H, 8.26; B, 17.66; N, 4.62; P, 9.90.

EXAMPLE II

*Bis(hydroxydiphenylphosphine) decaborane (II)*

To a suspension of bis(hydroxydiphenylphosphine) decaborane bis-dimethylamine salt (1.23 g., 0.002 mole) in ethanol (10 ml.), there was added dropwise with stirring a 5 percent alcoholic hydrochloric acid solution. The salt dissolved gradually and complete solution was effected after the theoretical amount of acid (.004 mole) had been added. The solution thus obtained was evaporated to dryness and the remaining semi-solid product was treated with hot water (20 ml.) to give 0.84 g. (80 percent of the theoretical quantity) of crude II. After recrystallization from xylene (50 ml.), the yield of pure II was 0.72 g. (69 percent of the theoretical quantity). Instead of showing a sharp melting point, the product softened somewhat at 215° C., but did not melt when heated to 300° C. Compound II is soluble in alcohols, acetone and ethyl acetate.

Calc'd for $C_{24}H_{34}B_{10}O_2P_2$: C, 54.93; H, 6.53; B, 20.62; P, 11.81. Found: C, 54.95; H, 6.75; B, 20.80; P, 11.70.

Compound II has the formula:

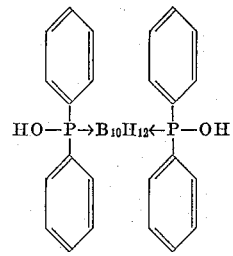

$HO-P \rightarrow B_{10}H_{12} \leftarrow P-OH$

What is claimed is:

1. Bis(hydroxydiarylphosphine) decaboranes of the general formula:

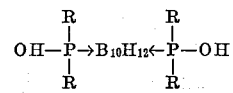

wherein R is an aryl radical selected from the group consisting of phenyl, tolyl, xylyl, naphthyl, and biphenyl.

2.

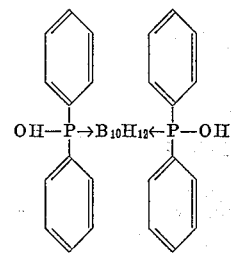

$OH-P \rightarrow B_{10}H_{12} \leftarrow P-OH$

3. Bis(hydroxydiarylphosphine) decaborane bis-alkyl amine salts of the general formula:

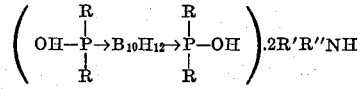

wherein R is an aryl radical selected from the group consisting of phenyl, tolyl, xylyl, naphthyl, and biphenyl and R' and R" are alkyl radicals having from 1 to 5 carbon atoms in each alkyl group.

4.

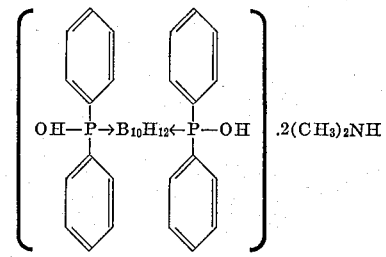

References Cited by the Examiner

UNITED STATES PATENTS

| | | | |
|---|---|---|---|
| 2,674,616 | 4/1954 | Morris | 260—501 X |
| 2,772,308 | 11/1956 | Jensen | 260—500 X |
| 2,871,263 | 1/1959 | Short | 260—501 X |
| 2,882,228 | 4/1959 | Watson. | |

OTHER REFERENCES

Miller: "Jour. Org. Chem.," vol. 24, pp. 2013–15 (1959).

Van Wazer: Phosphorous and Its Compounds, vol. 1, pages 261–262.

LEON ZITVER, *Primary Examiner.*

D. P. CLARKE, *Assistant Examiner.*